United States Patent
Okamoto et al.

(10) Patent No.: US 9,999,954 B2
(45) Date of Patent: Jun. 19, 2018

(54) MACHINE TOOL AND METHOD FOR CONTROLLING MACHINE TOOL

(71) Applicant: DMG MORI SEIKI CO., LTD., Yamatokoriyama-shi (JP)

(72) Inventors: Yoichi Okamoto, Yamatokoriyama (JP); Eiichiro Gomi, Yamatokoriyama (JP); Hiroki Nakao, Yamatokoriyama (JP); Yutaka Saito, Yamatokoriyama (JP)

(73) Assignee: DMG MORI SEIKI CO., LTD., Yamatokoriyama-shi (JP)

( * ) Notice: Subject to any disclaimer, the term of this patent is extended or adjusted under 35 U.S.C. 154(b) by 66 days.

(21) Appl. No.: 14/615,042

(22) Filed: Feb. 5, 2015

(65) Prior Publication Data
US 2015/0258650 A1  Sep. 17, 2015

(30) Foreign Application Priority Data
Mar. 17, 2014 (JP) ................... 2014-053584

(51) Int. Cl.
*B23Q 17/22* (2006.01)
*B23Q 17/09* (2006.01)
(Continued)

(52) U.S. Cl.
CPC ....... *B23Q 17/2241* (2013.01); *B23Q 17/098* (2013.01); *G05B 19/406* (2013.01);
(Continued)

(58) Field of Classification Search
CPC .............. B23Q 17/2241; B23Q 17/098; G05B 19/406; G05B 2219/37337; G10K 11/178; H04R 1/028; H04R 29/00
See application file for complete search history.

(56) References Cited

U.S. PATENT DOCUMENTS 4,023,044 A * 5/1977 Miller .................... B21D 55/00
307/116
4,642,617 A  2/1987 Thomas et al.
(Continued)

FOREIGN PATENT DOCUMENTS

JP  2002-059342 A    2/2002
JP  2002059342 A *  2/2002
(Continued)

OTHER PUBLICATIONS

Bruce, Robert, "Engineering Control for Reducing Workplace Noise", Fall 2007, National Academy of Engineering, The Bridge, p. 37 and 38.*

*Primary Examiner* — Sonia Gay
(74) *Attorney, Agent, or Firm* — Oblon, McClelland, Maier & Neustadt, L.L.P.

(57) ABSTRACT

A machine tool that can output an abnormal noise is provided. A machine tool includes: an input unit configured to receive an input of a setting for defining an operation mode of the machine tool; a storage unit configured to store sound generated during a normal operation of the machine tool and acquired in advance; a sound collection unit configured to collect sound in the machining area; a sound selection unit configured to extract a part of sound collected in the machining area in accordance with the setting input for outputting sound to the outside of the machine tool; and a sound output unit configured to output sound extracted by the sound selection unit to the outside of the machining area.

14 Claims, 6 Drawing Sheets

(51) Int. Cl.
  *G05B 19/406* (2006.01)
  *G10K 11/178* (2006.01)
  *H04R 1/02* (2006.01)
  *H04R 29/00* (2006.01)

(52) U.S. Cl.
  CPC ........... *G10K 11/178* (2013.01); *H04R 1/028* (2013.01); *H04R 29/00* (2013.01); *G05B 2219/37337* (2013.01)

(56) References Cited

U.S. PATENT DOCUMENTS

| | | | | |
|---|---|---|---|---|
| 4,642,618 A | * | 2/1987 | Johnson | B23B 49/001 340/683 |
| 4,980,844 A | * | 12/1990 | Demjanenko | G01H 1/00 340/680 |
| 5,170,358 A | * | 12/1992 | Delio | G05B 19/4163 173/2 |
| 5,804,726 A | * | 9/1998 | Geib | G01H 3/08 702/113 |
| 5,943,641 A | | 8/1999 | Carme et al. | |
| 6,470,377 B1 | * | 10/2002 | Sevcik | H04L 29/06 700/181 |
| 6,507,790 B1 | * | 1/2003 | Radomski | G01H 1/003 702/39 |
| 2004/0030419 A1 | * | 2/2004 | Miyasaka | G01H 1/00 700/32 |
| 2004/0236538 A1 | * | 11/2004 | Wobben | F03D 7/0264 702/188 |
| 2006/0142972 A1 | * | 6/2006 | Cancilla | G05B 23/0229 702/183 |
| 2007/0078551 A1 | * | 4/2007 | Lai | G11B 20/10 700/94 |
| 2007/0189546 A1 | * | 8/2007 | Togawa | G01H 3/08 381/61 |
| 2007/0255563 A1 | * | 11/2007 | Dooley | F02D 41/22 704/236 |
| 2008/0183429 A1 | * | 7/2008 | Piety | G01M 13/028 702/185 |
| 2009/0153144 A1 | * | 6/2009 | Hansen | G05B 23/0229 324/511 |
| 2009/0248194 A1 | * | 10/2009 | Lammering | G05B 19/4163 700/173 |
| 2012/0010744 A1 | * | 1/2012 | Yamashita | B23Q 15/12 700/173 |
| 2012/0232812 A1 | * | 9/2012 | Okita | B23Q 17/0976 702/56 |
| 2013/0030558 A1 | * | 1/2013 | Tezuka | G05B 19/408 700/94 |
| 2013/0035776 A1 | | 2/2013 | Kunstadt | |
| 2015/0112640 A1 | * | 4/2015 | Niro | G01D 15/00 702/183 |

FOREIGN PATENT DOCUMENTS

| | | | | |
|---|---|---|---|---|
| JP | 2002-312011 A | | 10/2002 | |
| JP | 2010 5759 | | 1/2010 | |
| TW | 201226102 A1 | * | 7/2012 | ............ B23Q 17/09 |

* cited by examiner

MACHINE TOOL AND METHOD FOR CONTROLLING MACHINE TOOL

BACKGROUND OF THE INVENTION

Field of the Invention

The present disclose relates to a machine tool, and more particularly relates to sound output during an operation of the machine tool.

Description of the Background Art

When determining a contact state between a tool and a workpiece, and a cutting state of a cutting edge during the machining operation of a machine tool, an operator makes such determinations based on his/her experience while relying on a sound generated from the cutting edge. During the operation of the machine tool, however, rotation sound is also generated from a spindle, the workpiece and the tool, which makes it difficult to distinguish only the sound required for such determinations.

Furthermore, a door of a machining area cannot be opened during the operation of the machine tool (for example, see Japanese Patent Laying-Open No. 2010-5759), which also makes it more difficult for an operator to distinguish the required sound.

SUMMARY OF THE INVENTION

Therefore, there is a need to develop a technique for allowing an operator of a machine tool to distinguish sound safely and easily.

A machine tool according to an embodiment comprises: a machining area; a microphone configured to collect sound in the machining area; an input unit configured to receive an input of a setting for defining an operation mode of the machine tool;

a sound selection unit configured to extract a part of sound collected in the machining area in accordance with the setting input for outputting sound to the outside of the machine tool; and a sound output unit configured to output sound extracted by the sound selection unit to the outside of the machining area.

A machine tool according to another embodiment comprises: a machining area; a microphone configured to collect sound in the machining area; an input unit configured to receive an input of a setting for defining an operation mode of the machine tool; a sound selection unit configured to extract a part of sound collected in the machining area in accordance with the setting input for outputting sound to the outside of the machine tool; and an informing unit configured to inform that a signal level of sound extracted by the sound selection unit is deviated from a predetermined range when the signal level is deviated from the predetermined range.

According to another embodiment, a method is provided for controlling a machine tool. This method comprises: collecting sound in a machining area of the machine tool; receiving an input of a setting for defining an operation mode of the machine tool; extracting a part of sound collected in the machining area in accordance with the setting input for outputting sound to the outside of the machine tool; and outputting the extracted sound to the outside of the machining area.

According to another embodiment, a method for controlling a machine tool, comprises: collecting sound in a machining area of the machine tool; receiving an input of a setting for defining an operation mode of the machine tool; extracting a part of sound collected in the machining area in accordance with the setting input for outputting sound to the outside of the machine tool; and informing that a signal level of the extracted sound is deviated from a predetermined range when the signal level is deviated from the predetermined range.

According to another embodiment, a non-transitory computer readable data storage medium is provided for storing a program for controlling a machine tool. The program causes a controller of the machine tool to perform: collecting sound in a machining area of the machine tool; receiving an input of a setting for defining an operation mode of the machine tool; extracting a part of sound collected in the machining area in accordance with the setting input for outputting sound to the outside of the machine tool; and outputting the extracted sound to the outside of the machining area.

According to another embodiment, a non-transitory computer readable data storage medium is provided for storing a program for controlling a machine tool. The program causes a controller of the machine tool to perform: collecting sound in a machining area of the machine tool; receiving an input of a setting for defining an operation mode of the machine tool; extracting a part of sound collected in the machining area in accordance with the setting input for outputting sound to the outside of the machine tool; and informing that a signal level of the extracted sound is deviated from a predetermined range when the signal level is deviated from the predetermined range.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The following describes the present embodiment in detail with reference to figures. It should be noted that the same or corresponding portions in the figures are given the same reference characters and explanations thereof are not repeated.

[Overview]

Figure 1:
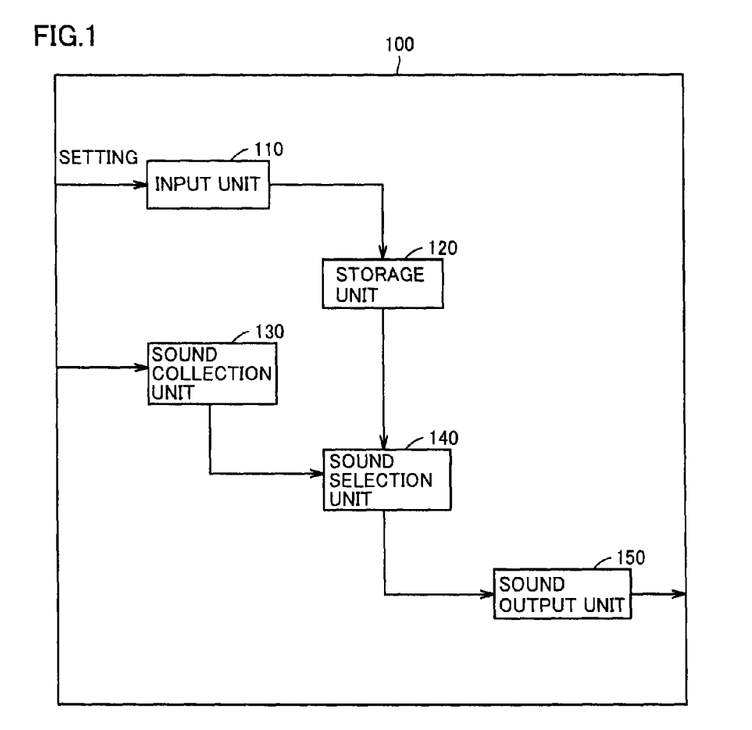
FIG. 1 is a block diagram showing a functional configuration realized by a machine tool 100 according to the present embodiment.

Referring to FIG. 1, an overview of a machine tool 100 according to the present embodiment will be described. FIG. 1 is a block diagram showing a functional configuration realized by machine tool 100 according to the present embodiment. Machine tool 100 includes an input unit 110, a storage unit 120, a sound collection unit 130, a sound selection unit 140, and a sound output unit 150.

Input unit 110 receives an input of a setting of one of a plurality of operation modes of machine tool 100. The input setting is stored in storage unit 120. For example, input unit 110 is realized by a touch panel, a physical switch, an input interface, and other input devices, provided on an operation surface of machine tool 100.

In the present embodiment, for example, the plurality of operation modes may include a mode in which sound generated during an operation of machine tool 100 is output to the outside of machine tool 100 and a mode in which the sound is not output to the outside, in addition to a mode in which a machining operation of machine tool 100 is defined. The mode in which sound generated during the operation is output to the outside may include a mode in which all sounds generated at machine tool 100 are output and a mode in which sound designated by an operator of machine tool 100 is output.

Storage unit 120 stores data or a program given to machine tool 100. For example, storage unit 120 stores a signal pattern of sound generated when machine tool 100 is normally operated under a predetermined condition. For example, such a signal pattern is acquired as sample data (teaching data) before machine tool 100 is operated. This signal pattern is used as a filter for extracting other sound during the operation of machine tool 100.

Storage unit 120 stores a program for defining an operation of machine tool 100. The program may include a program for extracting sound designated from sound generated during the operation of machine tool 100. In other aspects, the program may include a program for realizing a process of outputting sound to the outside of machine tool 100.

In other aspects, storage unit 120 stores data acquired by machine tool 100. For example, storage unit 120 is realized by a hard disk device, a flash memory, other nonvolatile data recording media, a RAM (Random Access Memory), and other volatile data recording media, or a memory card or other removable data recording media and the like. In other aspects, storage unit 120 may be realized by an external storage device such as a storage device connected to a network when machine tool 100 can be connected to the network.

Sound collection unit 130 collects sound in a machining area of machine tool 100. The sound in the machining area may include a chattering noise and other abnormal noises as well as rotation sound of a spindle, a cutting sound, a discharge sound of a coolant and other normal sound. Sound collection unit 130 is realized, for example, as a microphone having a dust proofing function and a drip proofing function.

Sound selection unit 140 functions as a sound filter. More specifically, sound selection unit 140 extracts a part of sound collected in the machining area in accordance with a setting input for outputting sound to the outside of machine tool 100. Sound selection unit 140 is realized by a processor that executes a sound extraction process program or a sound extraction circuit.

Sound output unit 150 outputs sound extracted by sound selection unit 140 to the outside of the machining area. For example, sound output unit 150 may include a speaker, a connection terminal of a headphone or other sound signal output interfaces, and the like.

For example, in an aspect, the operator designates or selects a range or a shape on a touch panel regarding at least one of a frequency, a waveform, phase and an amplitude to designate sound that is to be output. For example, a menu for selection is defined for each type of work and each machining condition of machine tool 100. Such selection is possible before and during the operation of machine tool 100.

For example, the above-mentioned range or shape represents a normal sound generated when machine tool 100 is normally operated. This normal sound is different depending on a type of work machined by machine tool 100, a type of tool and a machining condition and the like. The range or the shape designated or selected is stored in storage unit 120.

Sound collection unit 130 collects sound generated during the operation of machine tool 100. A signal of the collected sound is input to sound selection unit 140. In one example, sound selection unit 140 removes a sound element belonging to the range or the shape of at least one of a frequency, a waveform, phase and an amplitude designated by the operator, and transmits a signal of a remaining sound element to sound output unit 150. Sound output unit 150 outputs sound based on the signal of the remaining sound element.

For example, when machine tool 100 is normally operated, sound selection unit 140 removes the normal sound element. Therefore, in this case, sound is hardly output from sound output unit 150. On the other hand, when the chattering noise and other abnormal noises are generated during the machining operation of machine tool 100, an element of a frequency, a waveform or an amplitude of the abnormal noise is not removed by sound selection unit 140. Therefore, sound output unit 150 outputs the abnormal noise to the outside of machine tool 100.

[Hardware Configuration]

Figure 2:
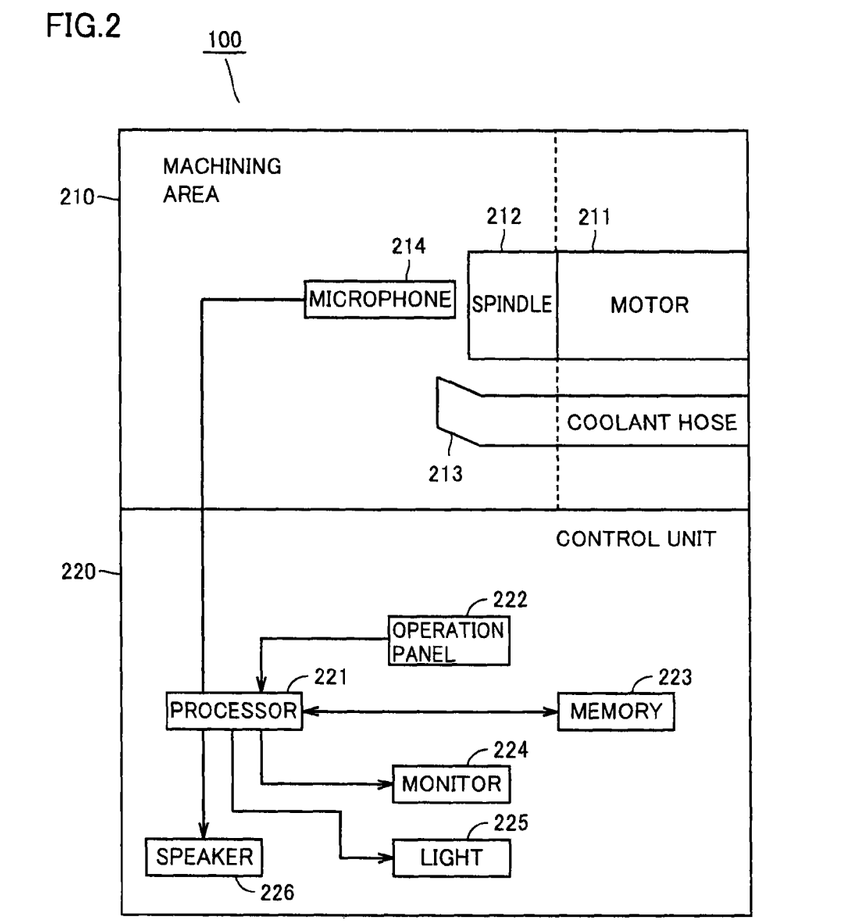
FIG. 2 is a block diagram showing a hardware configuration of machine tool 100.

Referring to FIG. 2, the configuration of machine tool 100 will be hereinafter further described. FIG. 2 is a block diagram showing the hardware configuration of machine tool 100. Machine tool 100 includes a machining area 210 and a control unit 220.

Machining area 210 includes a motor 211, a spindle 212, a coolant hose 213, and a microphone 214. Control unit 220 includes a processor 221, an operation panel 222, a memory 223, a monitor 224, a light 225, and a speaker 226.

Coolant hose 213 supplies a coolant liquid. Accordingly, the sound generated in machining area 210 may include sound generated when the coolant liquid is discharged.

In machining area 210, microphone 214 is attached as sound collection unit 130 in the vicinity of spindle 212, for example, so as to pick up the sound generated by driving spindle 212. The position at which microphone 214 is attached is desirably in the vicinity in which the sound is generated, but not limited to the vicinity of spindle 212. Furthermore, the position at which microphone 214 is attached can be changed.

In another aspect, a plurality of microphones may be provided in machining area 210. In this case, each microphone may be arranged in the vicinity of spindle 212, coolant hose 213 and other positions where sound may be generated.

In control unit 220, the signal of the sound collected by microphone 214 is input into processor 221. In a certain aspect, processor 221 serves as sound selection unit 140 to extract an abnormal noise from the sound generated in machining area 210. For example, processor 221 removes an element of sound recorded in memory 223 in advance as a normal operation sound of machine tool 100 from the sound acquired during the operation of machine tool 100, and outputs the signal of remaining sound (for example, a chattering noise) as an abnormal noise.

Operation panel 222 serves as input unit 110 to receive an input of an instruction from the operator of machine tool 100. Operation panel 222 is configured, for example, as a touch-screen type operation panel, a physical switch, and other types of input interfaces.

Memory 223 serves as storage unit 120 to hold a setting that defines the operation mode of machine tool 100. Furthermore, memory 223 holds teaching data, sample data and the like used for extracting the sound generated in machining area 210.

Based on the data output from processor 221, monitor 224 displays the operation state of machine tool 100 and the setting that defines the operation of machine tool 100. In a certain aspect, monitor 224 is realized by a liquid crystal display monitor, an organic EL (Electro Luminescence) monitor, or other display devices. In another aspect, monitor 224, which is a touch-screen type monitor, may be configured so as to receive an input of the setting of machine tool 100.

Light 225 indicates the operation state of machine tool 100. Light 225 is implemented as a lighting device that is capable of emitting at least one of red light, green light, blue light, and light of other colors, for example. Light 225 is implemented by an LED (Light Emitting Diode), for example.

Speaker 226 serves as sound output unit 150 to output a part of the sound collected in machining area 210 based on the instruction from processor 221. In another aspect, speaker 226 may output: the sound indicating that machine tool 100 is normally operating; the sound indicating that an unusual situation occurs in machine tool 100; or the like. In another aspect, speaker 226 may be provided in another room in which the state of machine tool 100 is monitored.

[Control Structure]

Figure 3:
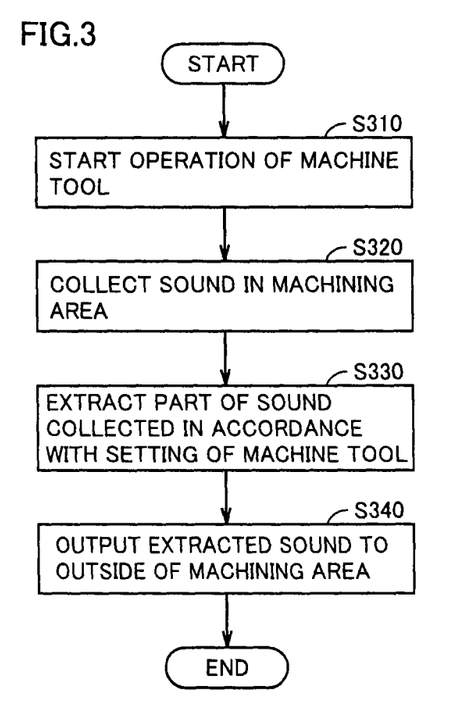
FIG. 3 is a flowchart showing a part of a series of processes executed by a processor 221.

Referring to FIG. 3, a control structure of machine tool 100 according to the present embodiment will be hereinafter described. FIG. 3 is a flowchart showing a part of a series of processes executed by processor 221.

In step S310, processor 221 starts the operation of machine tool 100 based on an instruction given to operation panel 222.

In step S320, processor 221 collects sound within machining area 210 through microphone 214. Processor 221 temporarily stores the collected sound in a working area of memory 223. In a certain aspect, processor 221 may sequentially store every sound generated during the operation of machine tool 100 in memory 223. In another aspect, processor 221 may store, in memory 223, only the sound generated in a certain period of time and collected in a predetermined cycle. Furthermore, the collected sound may be stored in a hard disk or other nonvolatile data recording devices in preparation for post-operation analysis.

In step S330, processor 221 serves as sound selection unit 140 to extract a part of sound collected by microphone 214 in accordance with the setting of machine tool 100 that is stored in memory 223. For example, the operator of machine tool 100 inputs the operation mode of machine tool 100 into machine tool 100. Processor 221 reads the sound that is adapted to the setting from memory 223 as a sound generated during the normal operation. Furthermore, during the operation of machine tool 100, processor 221 removes the sound that is adapted to this setting from the sound collected by microphone 214, and extracts remaining sound.

In step S340, processor 221 outputs the extracted sound to the outside of machining area 210 using speaker 226.

By such a configuration, during the operation, machine tool 100 may output, from speaker 226, a sound different from the sound generated in the steady state (that is, sound that is adapted to the setting). If abnormal situations such as damages to a tool and bearing wear of the rotation shaft occur during the operation of machine tool 100, speaker 226 outputs an abnormal noise. By hearing the abnormal noise, the operator of machine tool 100 can recognize that an abnormal situation occurs during the operation of machine tool 100, so that the operator can immediately take measures such as emergency shutdown, inspection, repair, and the like of machine tool 100.

[Other Aspects]

Figure 4:
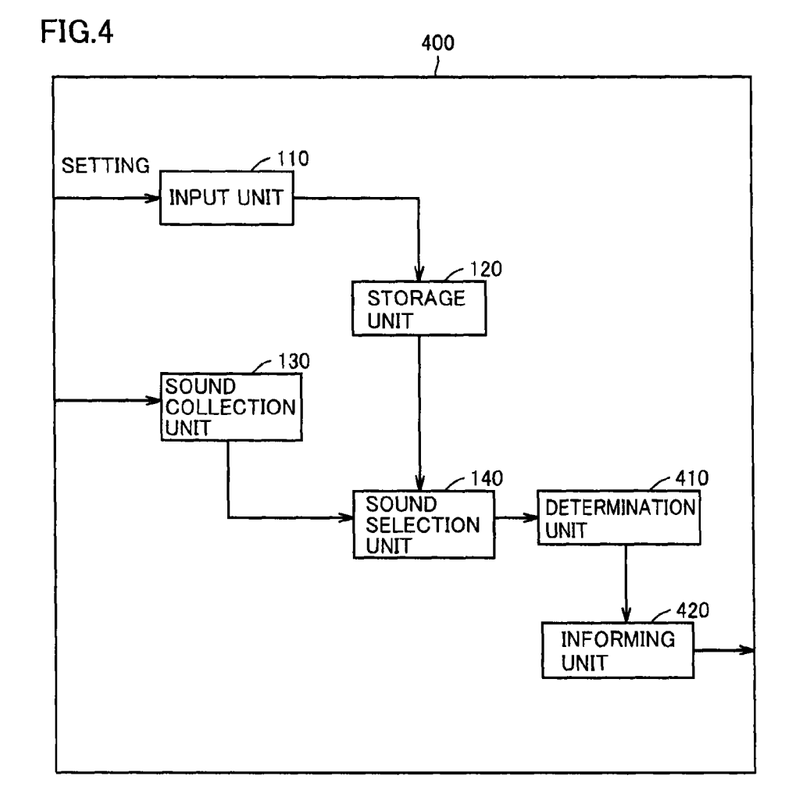
FIG. 4 is a block diagram showing a functional configuration realized by a machine tool 400.

Referring to FIG. 4, a machine tool 400 according to another aspect will be hereinafter described. FIG. 4 is a block diagram showing a functional configuration realized by machine tool 400. Since the same components as those provided in machine tool 100 will be designated by the same reference characters, detailed description thereof will not be repeated. Furthermore, the hardware configuration of machine tool 400 is the same as that shown in FIG. 2. Therefore, the description of the hardware configuration will also not be repeated.

In addition to the components of machine tool 100, machine tool 400 includes a determination unit 410 and an informing unit 420. Determination unit 410 determines whether the signal level of the sound selected by sound selection unit 140 is deviated or not from a predetermined range. For example, determination unit 410 compares the data showing the permissible range of one of a frequency, a waveform and an amplitude of the sound stored in storage unit 120 (a reference value) with the signal level of the sound selected by sound selection unit 140 (an actual measurement value). When the signal level of the sound extracted by sound selection unit 140 (actual measurement value) is deviated from the predetermined range (a reference value), determination unit 410 outputs an instruction to informing unit 420 to inform that the signal level is deviated from the predetermined range. When receiving such an instruction, informing unit 420 informs that an abnormal noise is generated in machine tool 400.

[Control Structure]

Figure 5:
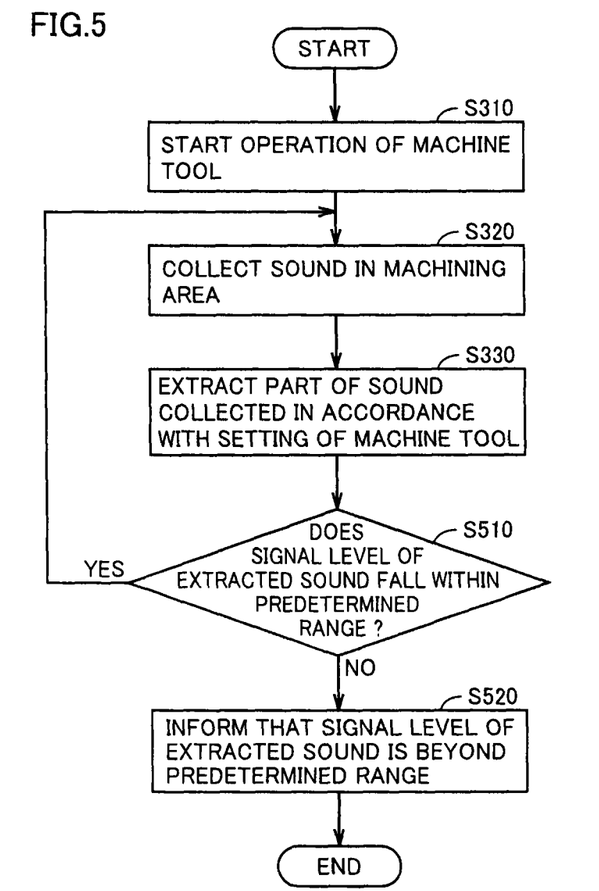
FIG. 5 is a flowchart showing a part of the process executed by processor 221 of machine tool 400.

Referring to FIG. 5, the control structure of machine tool 400 will be hereinafter described. FIG. 5 is a flowchart showing a part of the process executed by processor 221 of machine tool 400. It should be noted that the same processes as those described above will be designated by the same step numbers. Therefore, description thereof will not be repeated.

In step S510, processor 221 determines whether the signal level of the extracted sound falls within the predetermined range or not. If processor 221 determines that the signal level falls within this predetermined range (YES in step S510), it returns the control to step S320. Processor 221 continues to collect the sound generated within machining area 210 using microphone 214. If not (NO in step S510), processor 221 shifts the control to step S520.

In step S520, processor 221 informs that the signal level of the extracted sound is beyond the predetermined range. For example, speaker 226 outputs the sound informing that the signal level of the extracted sound is beyond the predetermined range. In another aspect, light 225 flashes on and off while emitting a color predetermined as informing that the signal level of the extracted sound is beyond the predetermined range. Alternatively, monitor 224 displays a message indicating that the signal level of the extracted sound is beyond the predetermined range. When machine tool 400 is connected to a monitoring system (not shown) through a network, machine tool 400 can transmit, to a central monitoring system, a signal informing that an abnormal noise is generated.

[Informing Manner]

Figure 6:
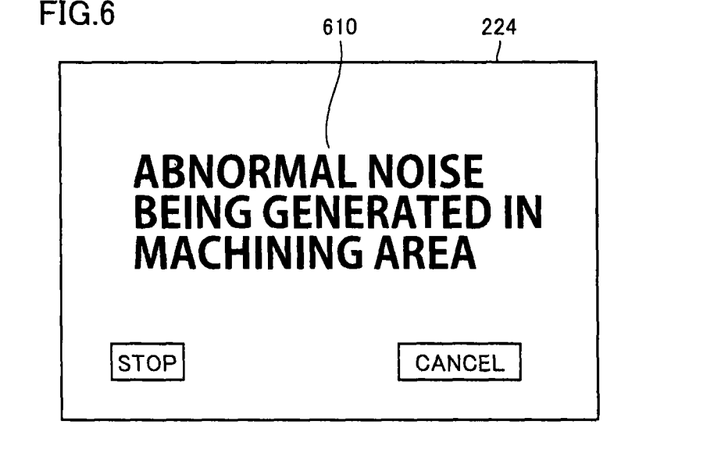
FIG. 6 is a diagram showing an example of a display on a screen in a monitor 224.

Then, referring to FIG. 6, an example of the informing manner of machine tool 400 according to a certain aspect will be hereinafter described. FIG. 6 is a diagram showing an example of a display on a screen in monitor 224.

In a certain aspect, when an abnormal noise is detected in machining area 210 of machine tool 400, monitor 224 displays a message 610. Message 610 shows that an abnormal noise is generated in the machining area. By recognizing such message 610, the operator of machine tool 400 can safely and easily recognize that a certain abnormal situation occurs in machine tool 400.

As described above, according to machine tools 100 and 400 in the present embodiment, the sound that the operator of the machine tool needs to monitor (abnormal noise) can be output from a speaker in the state where the door of machining area 210 remains closed. Since the operator can safely and easily recognize the operation state of the machine tool, the safety can be maintained.

Furthermore, by inputting a setting through input unit 110, the operator can easily select a sound that he/she needs to extract. Therefore, for example, when the operator needs to: detect the contact state of the tool; detect whether chattering occurs or not; detect damages to the cutting edge of the tool; and the like, the operator can easily switch the setting depending on the purpose. Consequently, the operativity of the machine tool can be improved.

Furthermore, since machine tool 400 can inform the sound detection state using a message or in other manners, the operator can safely and easily recognize the state of the machine tool based on the informed contents without always having to listen to the sound from the speaker. It is a matter of course that the operator may output, in real time, the sound that he/she needs to monitor among the sounds generated within the machining area.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A machine tool comprising:
   an enclosed machining area that includes a door that remains closed during operation of the machine tool;
   a microphone configured to collect sounds generated by the operation of the machine tool in the enclosed machining area; and
   circuitry configured to
      receive, from an operator of the machine tool, an input of a characteristic of the sounds generated by the operation of the machine tool to be used to extract an abnormal noise part of the sounds generated by the operation of the machine tool;
      extract the abnormal noise part of the sounds generated by the operation of the machine tool and collected in the enclosed machining area for output to the operator, the abnormal noise part being extracted in accordance with the characteristic of the sounds input by the operator; and
      output only the extracted abnormal noise part of the sounds to a speaker or earphone located outside of the enclosed machining area during the operation of the machine tool, wherein
   the extracted abnormal noise part does not include all the sounds generated by the operation of the machine tool and collected in the enclosed machining area.

2. The machine tool according to claim 1, wherein the circuitry is configured to:
   extract a sound element included in a range defined by the input characteristic regarding at least one of a frequency, a phase and an amplitude selected as extraction criteria of the abnormal noise part of the collected in the enclosed machining area; or
   remove the sound element included in the range defined by the input characteristic regarding at least one of a frequency, a phase and an amplitude selected as exclusion criteria of the sounds collected in the enclosed machining area and extract the remaining sound from which the sound element is removed as the abnormal noise part of the sounds.

3. The machine tool according to claim 1, further comprising:
   a storage medium configured to store a signal of sound acquired in advance as an operation sound of the machine tool, wherein
   the circuitry is configured to:
      extract a sound element similar to the signal of sound acquired in advance as the abnormal noise part of the sounds, or
      extract the abnormal noise part of the sounds by removing the signal of sound acquired in advance from the sounds collected in the enclosed machining area.

4. A machine tool comprising:
   an enclosed machining area that includes a door that remains closed during operation of the machine tool;
   a microphone configured to collect sounds generated by the operation of the machine tool in the enclosed machining area; and
   circuitry configured to
      receive, from an operator of the machine tool, an input of a characteristic of the sounds generated by the operation of the machine tool to be used to extract an abnormal noise part of the sounds generated by the operation of the machine tool;
      extract the abnormal noise part of the sounds corresponding to an abnormal noise that is generated by the operation of the machine tool and collected in the enclosed machining area in accordance with the characteristic of the sounds input by the operator;
      output only the extracted abnormal noise part of the sounds to a speaker or earphone located outside of the enclosed machining area during the operation of the machine tool; and
      provide, during the operation of the machine tool, an indication to the operator of the machine tool that a signal level of the extracted abnormal noise part of the sounds is deviated from a predetermined range when the signal level is deviated from the predetermined range.

5. The machine tool according to claim 4, wherein the circuitry is configured to:
   extract a sound element included in a range defined by the input characteristic regarding at least one of a frequency, a phase and an amplitude selected as extraction criteria of the abnormal noise part of the sounds collected in the enclosed machining area; or
   remove the sound element included in the range defined by the input characteristic regarding at least one of a frequency, a phase and an amplitude selected as exclusion criteria of the sounds collected in the enclosed machining area and extract the remaining sound from which the sound element is removed as the abnormal noise part of the sounds.

6. The machine tool according to claim 4, further comprising:
a storage medium configured to store a signal of sound acquired in advance as an operation sound of the machine tool, wherein
the circuitry is configured to:
extract a sound element similar to the signal of sound acquired in advance as the abnormal noise part of the sounds, or
extract the abnormal noise part of the sounds by removing the signal of sound acquired in advance from the sounds collected in the enclosed machining area.

7. A method for controlling a machine tool, comprising:
collecting sound generated by operation of the machine tool in an enclosed machining area of the machine tool that includes a door that remains closed during the operation of the machine tool;
receiving, from an operator of the machine tool, an input of a characteristic of the sounds generated by the operation of the machine tool to be used to extract an abnormal noise part of the sounds generated by the operation of the machine tool;
extracting the abnormal noise part of the sounds collected in the enclosed machining area for output to the operator, the abnormal noise being extracted in accordance with the characteristic of the sounds input by the operator; and
outputting only the extracted abnormal noise part of the sounds to a speaker or earphone located outside of the enclosed machining area during the operation of the machine tool, wherein
the extracted abnormal noise part does not include all the sounds generated by the operation of the machine tool and collected in the enclosed machining area.

8. The method according to claim 7, wherein the extracting includes:
extracting a sound element included in a range defined by the input characteristic regarding at least one of a frequency, a phase and an amplitude selected as extraction criteria of the abnormal noise part of the sounds collected in the enclosed machining area; or
removing the sound element included in the range defined by the input characteristic regarding at least one of a frequency, a phase and an amplitude selected as exclusion criteria of the sounds collected in the enclosed machining area and extracting the remaining sound from which the sound element is removed as the abnormal noise part of the sounds.

9. The method according to claim 7, further comprising:
accessing a signal of sound acquired in advance as an operation sound of the machine tool, wherein
the extracting includes:
extracting a sound element similar to the signal of sound acquired in advance as the abnormal noise part of the sounds, or
extracting the abnormal noise part of the sounds by removing the signal of sound acquired in advance from the sounds collected in the enclosed machining area.

10. A method for controlling a machine tool, comprising:
collecting sounds generated by operation of the machine tool in an enclosed machining area of the machine tool that includes a door that remains closed during the operation of the machine tool;
receiving, from an operator of the machine tool, an input of a characteristic of the sounds generated by the operation of the machine tool to be used to extract an abnormal noise part of the sounds generated by the operation of the machine tool;
extracting an abnormal noise part of the sounds corresponding to an abnormal noise that is generated by the operation of the machine tool and collected in the enclosed machining area in accordance with the characteristic of the sounds input by the operator;
output only the extracted abnormal noise pan of the sounds to a speaker or earphone located outside of the enclosed machining area during the operation of the machine tool; and
providing, during the operation of the machine tool, an indication to the operator of the machine tool that a signal level of the extracted abnormal noise part of the sounds is deviated from a predetermined range when the signal level is deviated from the predetermined range.

11. The method according to claim 10, wherein the extracting includes:
extracting a sound element included in a range defined by the input characteristic regarding at least one of a frequency, a phase and an amplitude selected as extraction criteria of the abnormal noise part of the sounds collected in the enclosed machining area; or
removing the sound element included in the range defined by the setting input characteristic regarding at least one of a frequency, a phase and an amplitude selected as exclusion criteria of the sounds collected in the enclosed machining area and extracting the remaining sound from which the sound element is removed as the abnormal noise part of the sounds.

12. The method according to claim 10, further comprising:
accessing a signal of sound acquired in advance as an operation sound of the machine tool, wherein
the extracting includes:
extracting a sound element similar to the signal of acquired in advance as the abnormal noise part of the sounds, or
extracting the abnormal noise part of the sounds by removing the signal of sound acquired in advance from the sounds collected in the enclosed machining area.

13. The machine tool according to claim 1, further comprising:
a memory configured to store a predetermined sound for each of a plurality of operation modes, wherein
the circuitry is configured to extract the abnormal noise part of the sounds generated by the operation of the machine tool based on the predetermined sound associated with a selected one of the plurality of operation modes.

14. The machine tool according to claim 4, further comprising:
a memory configured to store a predetermined sound for each of a plurality of operation modes, wherein
the circuitry is configured to extract the abnormal noise part of the sound corresponding to the abnormal noise that is generated by the operation of the machine tool based on the predetermined sound associated with a selected one of the plurality of operation modes.

\* \* \* \* \*